Figure 1:
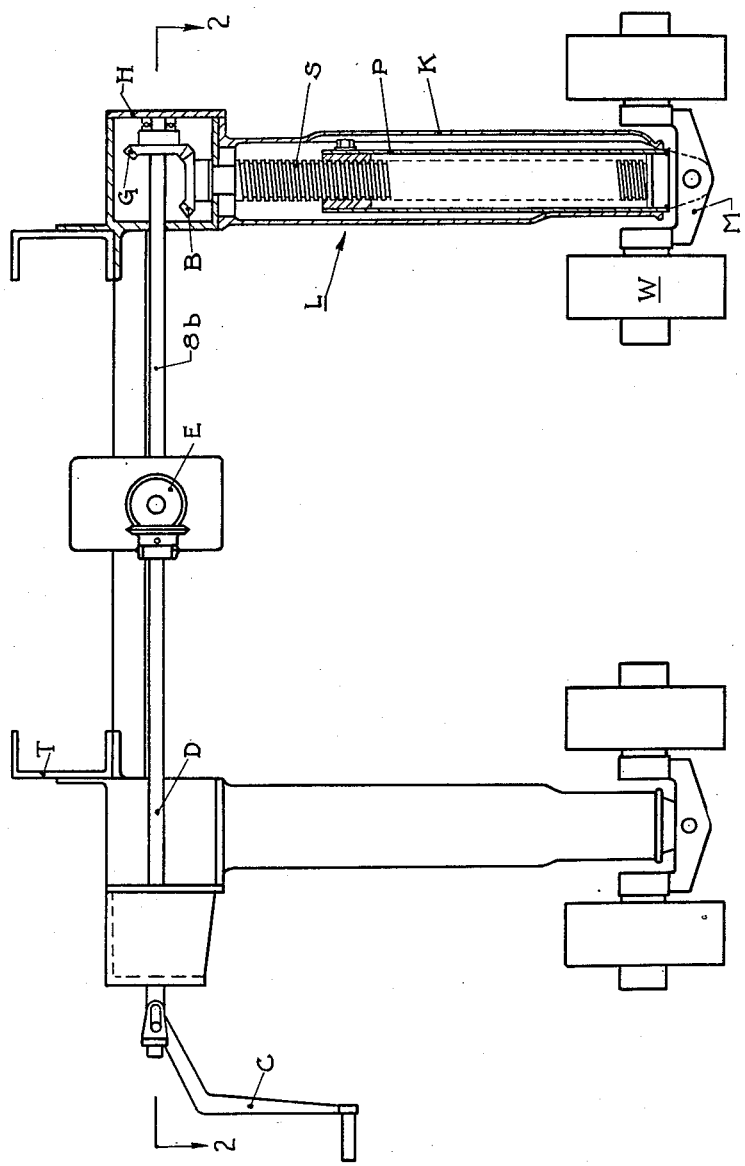

May 2, 1944.  E. L. MILLER  2,347,921
SCREW TYPE TRAILER LANDING GEAR
Filed Oct. 12, 1942  2 Sheets-Sheet 1

INVENTOR
ELMER L. MILLER
BY Arthur H. Robert
ATTORNEY

May 2, 1944.   E. L. MILLER   2,347,921
SCREW TYPE TRAILER LANDING GEAR
Filed Oct. 12, 1942   2 Sheets-Sheet 2
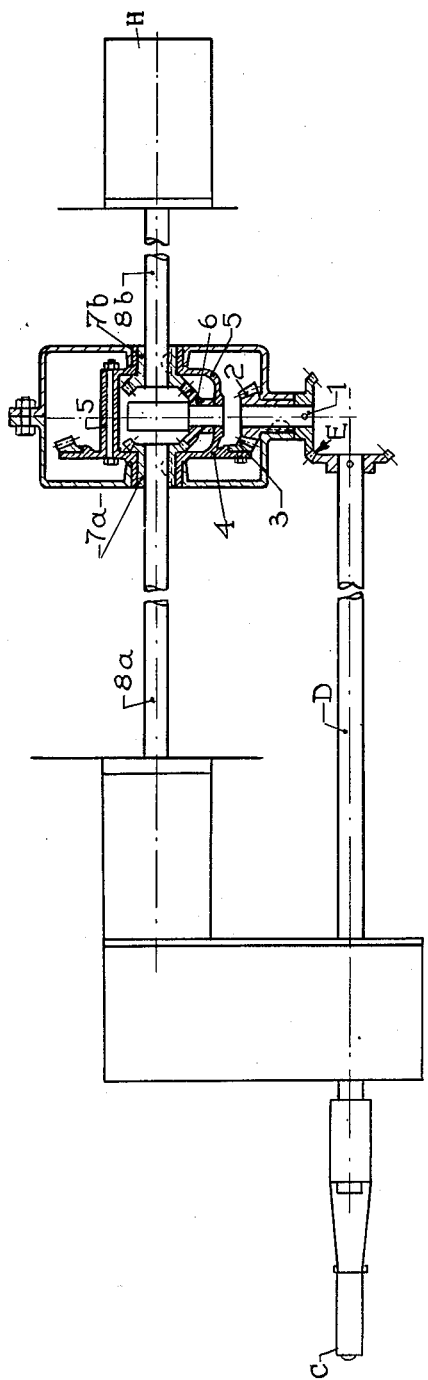
INVENTOR
ELMER L. MILLER
BY Arthur H Robert
ATTORNEY Patented May 2, 1944

2,347,921

UNITED STATES PATENT OFFICE 2,347,921

SCREW TYPE TRAILER LANDING GEAR

Elmer L. Miller, Dayton, Ohio, assignor to The Dayton Steel Foundry Company, Dayton, Ohio, a corporation of Ohio Application October 12, 1942, Serial No. 461,820

1 Claim. (Cl. 254—86)

This invention relates to trailer landing gears of the screw type.

It is highly desirable to operate screw type landing gears from a single source of power which effects the extension and retraction of the legs simultaneously. The chief difficulty with this type of drive is, that, where unequal ground levels are encountered, it does not distribute the load equally upon both legs but compels that leg first engaging the ground to assume the full load until both legs are additionally extended to a point where the other leg firmly presses against the ground. Necessarily this subjects the landing gear to undesirable stresses and strains, tends to twist the trailer body and may cause the trailer to tilt to a dangerous degree.

The principal object of the present invention is to overcome this difficulty in a screw type landing gear having a common drive.

Another important object is to provide a simple drive mechanism for both legs of a screw type landing gear which mechanism will compel both legs to engage the ground before either leg takes the load and thereafter compels both legs to take the load equally.

The invention is illustrated in the accompanying drawings wherein:

Figure 1 is a view partly in section and partly in elevation showing a screw type landing gear embodying the invention; and Figure 2 is a section along line 2—2 of Figure 1.

The drawings illustrate a pair of more or less standard screw-type landing gear legs L conventionally secured to a trailer T of which only a fragment of the chassis is shown. Each standard or conventional screw type leg includes: a box frame or housing H rigidly secured to the chassis of the trailer T; a screw S rotationally mounted upon the housing to depend therefrom with its upper end extending into the housing where it is geared, through bevel gears B and G to an intermediate drive shaft; landing gear wheels W rotationally mounted on a common cross member M which is pivotally secured to the lower end of an inner pipe P dimensioned to fit over the screw S, the upper end of the pipe P being threaded to the screw; and an outer casing K surrounding the screw and the inner pipe P with its upper end rigidly secured to the box housing H and its lower end frictionally fitted over the inner pipe P to guide the pipe P as the pipe moves vertically along the screw.

For convenience the intermediate drive shaft carrying bevel gear G for the left leg is designated by the numeral 8a and for the right leg by the numeral 8b. These shafts 8a and 8b are connected to a common source of power which may comprise any conventional arrangement such as the hand crank C and drive shaft D. The arrangement is such that, when crank C is turned to rotate drive shaft D, the intermediate shafts 8a and 8b will operate through bevel gears G and B to rotate screw S and thereby extend or retract the assembly containing wheels W.

In accordance with my invention the drive shaft D is connected to the intermediate drive shafts 8a and 8b by a differential mechanism. The drive shaft D is geared at E to the propeller shaft I of the differential mechanism. The propeller shaft I carries a bevel pinion gear 2 which, when rotated, drives a large bevel ring gear 3. The ring gear is rigidly secured to the peripheral flange 4 of a hollow spider or spider-like casing 5. The spider 5 rotationally carries, within its chamber, a bevel pinion gear 6 which is geared, through bevel gears 7a and 7b at opposite sides of the chamber, respectively to the intermediate drive shafts 8a and 8b. The differential gearing is conventionally enclosed in a suitable housing 9, which may be rigidly secured to the chassis of the trailer T in any suitable manner. As shown, the housing 9 is rigidly secured to a cross member 10 extending from one box frame H to the other and rigidly secured to both.

With a differential mechanism thus interposed between a common drive shaft D, and the separate drive shafts 8a and 8b of each leg, it will be evident:

(a) That, during the extension of the legs over unequal ground levels, both legs will move until the one leg first engages the "high" ground, thereupon the other leg will move until it engages the "low" ground and thereafter both legs will move simultaneously sharing the load equally;

(b) And that, during the retraction of unequally extended legs, both legs will be retracted more or less equally until the less extended or "shorter" leg is fully retracted whereupon the "longer" leg will continue to retract until it is in the fully retracted position.

Having described my invention, I claim:

A trailer landing gear comprising: a pair of screw type landing gear legs, each mounted for extension and retraction between fully extended and retracted positions, each leg including a trailer frame member, a screw rotationally mounted on and depending from said frame, a gear secured to the upper end of the screw, a non-rotatable inner sleeve encircling the screw and threaded at its upper end to the screw for extension and retraction relatively thereto, and an outer sleeve encircling the inner sleeve with its upper end affixed to said frame and its lower end slidably fitting around the inner sleeve in order to guide and support it, a common drive shaft for said legs; and a differential mechanism connecting said drive shaft differentially to each gear, said mechanism being operative when actuated by said drive shaft to extend said legs unequally to bring them into contact with different ground levels before either leg assumes any appreciable load and to retract unequally extended legs to their fully retracted positions.

ELMER L. MILLER.